US008291474B2

(12) United States Patent
Anderson et al.

(10) Patent No.: US 8,291,474 B2
(45) Date of Patent: Oct. 16, 2012

(54) USING OPAQUE GROUPS IN A FEDERATED IDENTITY MANAGEMENT ENVIRONMENT

(75) Inventors: Anne H. Anderson, Acton, MA (US); Seth T. Proctor, Concord, MA (US)

(73) Assignee: Oracle America, Inc., Redwood Shores, CA (US)

( * ) Notice: Subject to any disclaimer, the term of this patent is extended or adjusted under 35 U.S.C. 154(b) by 788 days.

(21) Appl. No.: 12/104,141

(22) Filed: Apr. 16, 2008

(65) Prior Publication Data

US 2009/0265753 A1    Oct. 22, 2009

(51) Int. Cl.
*H04L 29/06* (2006.01)

(52) U.S. Cl. .................. 726/3; 726/5; 726/8; 713/155

(58) Field of Classification Search .............. 726/5, 8, 726/3

See application file for complete search history.

(56) References Cited

U.S. PATENT DOCUMENTS

| | | | |
|---|---|---|---|
| 7,203,315 B1 * | 4/2007 | Livesay ............................ | 726/5 |
| 7,370,351 B1 * | 5/2008 | Ramachandran et al. ........ | 726/8 |
| 7,467,399 B2 * | 12/2008 | Nadalin et al. ..................... | 726/2 |
| 7,562,382 B2 * | 7/2009 | Hinton et al. ...................... | 726/2 |
| 7,607,008 B2 * | 10/2009 | Howard et al. ............... | 713/155 |
| 7,631,346 B2 * | 12/2009 | Hinton et al. ...................... | 726/8 |
| 7,657,639 B2 * | 2/2010 | Hinton .......................... | 709/229 |
| 7,784,092 B2 * | 8/2010 | Pearson et al. ..................... | 726/8 |
| 7,836,298 B2 * | 11/2010 | Gross et al. ................... | 713/155 |
| 2003/0149781 A1 * | 8/2003 | Yared et al. .................... | 709/229 |
| 2006/0021018 A1 * | 1/2006 | Hinton et al. .................. | 726/10 |
| 2006/0048216 A1 * | 3/2006 | Hinton et al. ..................... | 726/8 |
| 2008/0021997 A1 * | 1/2008 | Hinton .......................... | 709/225 |

OTHER PUBLICATIONS

Evans, Beresford, Burbridge & Soppera. "Context-derived pseudonyms for protection of privacy in transport middleware and applications". 2007. Proceedings of the fifth annual IEEE international conference on pervasive computing and communications workshop. IEEE. pp. 3-4.*
Pearlman, Welch, Foster, Kesselman & Tuecke. "A Community authorization service for group collaboration". 2002. Proceedings of the third international workshop of policies for distributed systems and networks. IEEE.*
Peyton, Hu, Doshi & Seguin. "Addressing privacy in a federated identity management network for e-health". Eighth world congress on the management of eBusiness. IEEE.*
Bhargav-Spantzel, Squicciarini & Bertino. "Establishing and protecting digital identity in federation systems". 2006. IOS Press. Journal of Computer Security, 14. 33 pages.*
Gomi, Hatakeyama, Hosono & Fujita. "A Delegation framework for federated identity management". Nov. 2005. ACM. DIM'05. pp. 94-103.*

* cited by examiner

*Primary Examiner* — Carl Colin
*Assistant Examiner* — Gary Lavelle
(74) *Attorney, Agent, or Firm* — Park, Vaughan, Fleming & Dowler LLP

(57) ABSTRACT

A system and method for using an opaque group within a federated identity management environment, to prevent disclosure of identities of the group. An opaque group is constructed at an identity provider within the system and has a group identity that references primary system identities of its members (e.g., electronic mail addresses, public key certificates, network addresses). Services to the group (e.g., distribution of an object such as a document or electronic mail message, invitation to an online meeting, authentication as a member of the group) can be requested from service providers, but because service providers do not have access to members' primary identities, the service providers forward the requests to an identity provider that has access to the group identity. That identity provider retrieves the members' identities and completes the action.

19 Claims, 2 Drawing Sheets

USING OPAQUE GROUPS IN A FEDERATED IDENTITY MANAGEMENT ENVIRONMENT

BACKGROUND

This invention relates to the field of computer systems. More particularly, a system and method are provided for using opaque groups within a federated identity community or environment.

Identity management—the process of identifying or verifying a user's identity—has evolved from centralized solutions to federated solutions. In a centralized identity management system, each network, domain, namespace or other userspace is separately and independently managed. Each space authenticates users that connect to the space, for activity solely within that domain, and a user that accesses multiple spaces must separately verify its identity within each space (e.g., via separate login procedures).

In a federated identity management solution, two or more separately managed identity systems trust each other to properly assign and verify user identities. By cooperating in the authentication and authorization of users, they promote the portability of user identities between the separate systems' spaces and facilitate users' access to resources residing outside their own spaces.

For example, two or more organizations may agree to trust each other's identity management systems and practices. Then, when a customer or employee logs in to his or her home userspace, the user's authenticated identity and identity attributes will be accepted in the other organizations' spaces. The user may therefore access resources in all cooperating organizations' networks while only logging in and verifying his or her identity once.

However, existing federated identity management systems, or federations, require users' true identities to be shared when they use services within the federated system. As one consequence, membership in groups cannot be obscured and any member can see other members' true identities. For example when a message is distributed to all members or the members gather for an online meeting, their true identities are visible throughout the group. For some groups this may not be a problem, but when the group comprises business competitors (or other users and/or organizations that are or may be in conflict) cooperating in a technical standards committee, trade forum, industry working group or other such gathering, it may be more conducive to the group and its purpose if membership could be anonymous.

SUMMARY

In an embodiment of the invention, a system and method are provided for using opaque groups within a federated identity management system. In this embodiment, an opaque group comprises a group of users whose true or primary identities (e.g., electronic mail addresses, public key certificates, usernames, identity providers) are known only to their home identity providers—the entities designed to authenticate users of the federated identity management system. Members' identities are not provided to service providers, which are configured to provide services within the identity management system, or at least not when a service is being provided that would normally cause the members' true identities to be revealed to other group members.

In some embodiments of the invention, a service provider may be called upon to offer a service to the entire group. For example, one member may request the service provider send to the group an electronic mail message, a meeting invitation, a document or some other object. Because the service provider does not know the group members' identities, the service provider forwards the request to an identity provider that knows their identities and can resolve a secondary identity to a corresponding primary identity within the federation. The identity provider retrieves the members' identities and forwards the object. For example, the service provider may send the request to all identity providers because in this embodiment it does not even know which identity providers have users that are members of the group.

In some embodiments, members of an opaque group are given secondary identities, which may be anonymous or arbitrary to prevent their actions from being attributed to them, their identity providers, their home organizations, etc. Instead of an anonymous identity, an identity of a member of an opaque group may comprise an identifier of another opaque group, an indirection point that relays a group communication to a member in different manners (e.g., electronic mail, facsimile) or via different destinations (e.g., different electronic mail addresses or telephone numbers) based on the context of the communication. In these embodiments, service providers can provide services to individual group members using their secondary identities, again via an identity provider.

An opaque group may therefore be used to mask the true identities of a group of users. For example, the group may represent a coalition of cooperating organizations that, outside of the coalition, are competitors. Within the opaque group, which may hold online meetings, share documents, and so on, members can fully participate without having their activity attributed to their organizations.

In some embodiments of the invention, a moderator, founder or primary user within an opaque group establishes the group identity and populates the group identity with members' primary identities and, possibly, secondary identities. Using the group identity, the moderator can distribute messages to all members of the opaque group, assemble them for an online conference or take other action. Service providers and members of the group see, at most, the secondary identities of the group's members, along with the name of the group.

DETAILED DESCRIPTION

Figure 1:
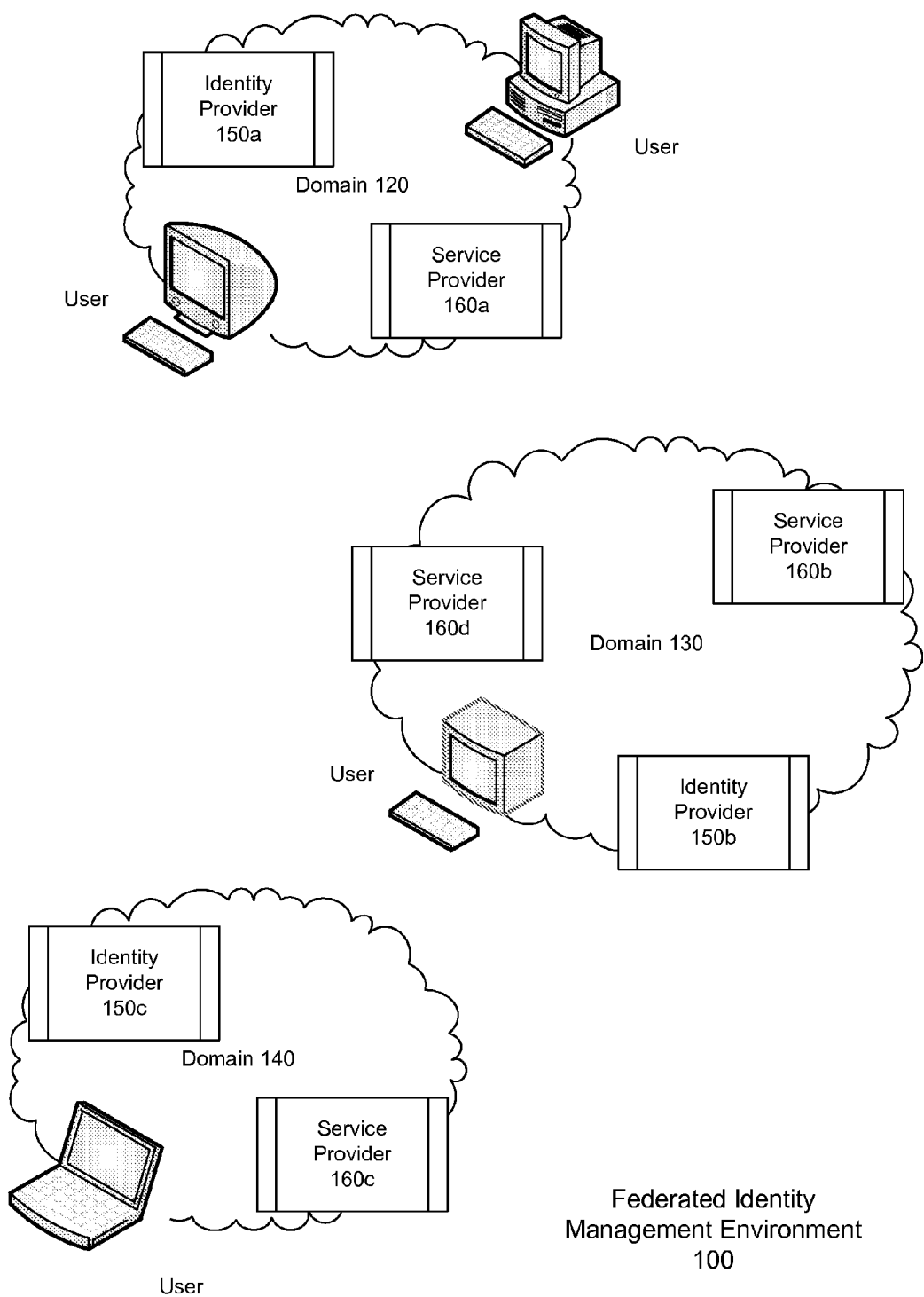
FIG. 1 is a block diagram depicting a federated identity management environment in which with an embodiment of the present invention may be implemented.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In an embodiment of the invention, a system and method are provided for using an opaque group within a federated identity management environment (or identity federation). The opaque group is configured so that when a message is distributed to members of the group, or other group action is initiated, the action can be completed without revealing the members' primary identities (e.g., username, electronic mail address, organization, identity provider).

In particular, members' true identities are not revealed to other members when an electronic mail message is sent from one member to other members, when a document is distributed, when an online meeting is held, and so on. Each member's home identity provider knows which of its users are members of a particular group, and therefore a member can assert membership in a group and his or her membership can be verified.

Within a federated identity management environment or system, which may also be termed a federation, a service provider is an entity that provides a service to other system entities. An identity provider is a specialized service provider designed to authenticate users and other entities (e.g., applications, system resources).

An identity provider usually operates within a single organization's network, domain or other userspace, but is able to share identity information with other service providers throughout the federation. Thus, when a user connects to a first domain within the environment, he or she is authenticated by the corresponding organization's identity provider, which may be considered the user's home identity provider. Authentication of the user and attributes of the authenticated user are then shared as the user takes action throughout the federated environment to access data, execute an application, etc.

In some embodiments of the invention described herein, the term domain may be used to refer to a domain, network, namespace or other space of an individual organization that is connected to one or more other organizations within a federated identity management system. Comparable terms may also be used, and will be understood from the context to refer to individual domains or spaces within a federation.

Embodiments of the invention described herein are well-suited for implementation with SAML (Security Assertion Markup Language)—a standardized XML-based framework for communicating user authentication, entitlement and attribute information. SAML is a trademark of OASIS (Organization for the Advancement of Structured Information Standards).

FIG. 1 depicts a federated identity management environment in which an embodiment of the invention may be implemented.

Within environment 100, identity information is shared among domains 120, 130 and 140 to authenticate users and promote access to resources throughout the environment. Identity providers 150 (e.g., identity providers 150a, 150b, 150c) create, maintain and manage identity information for entities whose identities can be authenticated (e.g., users, applications, hardware devices). In particular, the identity providers authenticate these entities to service providers 160 (e.g., service providers 160a, 160b), so that they may use services offered by the providers. Each domain may have a single "home" identity provider or, in alternative embodiments, may comprise multiple identity providers.

Every user within environment 100 has a primary identifier that uniquely identifies the user within environment 100, within his or her home domain (e.g., domain 120, 130 or 140), and/or beyond environment 100. A user's primary identifier may be a username, an electronic mail address, an IP (Internet Protocol) address, some other network address, etc. Besides uniquely identifying the user, a primary identifier may also identify a user's organization and/or an identity provider that authenticates users within the organization.

In embodiments of the invention, users can configure "opaque" groups of any number of users, to allow action to be taken by those users (and/or other federation entities that can be authenticated) without revealing the members' primary identities. In some implementations, only a user's home identity provider (i.e., an identity provider within the user's home domain) may establish an opaque group for the user. In other implementations any identity provider can establish an opaque group for any user.

The user creating an opaque group, or the identity provider at which the group is created, selects a name for the group. In some embodiments, secondary identities for identifying the users within the group may also be selected, assigned or randomly generated. The members' primary identities may be known to the creating user and identity provider, and possibly other identity providers, but are not distributed to service providers or other group members.

In other embodiments, a member of an opaque group may have a secondary identity corresponding to another opaque group, an indirection point or any other connection to an identity within the environment. An indirection point comprises an entity (e.g., a service provider, an identity provider) that contacts the user in different ways based on the context or form of the information to be communicated.

For example, a member of an opaque group that uses an indirection point may receive information at different addresses (e.g., electronic mail, instant messages, physical mail), telephone numbers (e.g., facsimile, voice message), etc. Based on the form of information to be sent to the user, its time sensitivity, urgency or other factor, the indirection point forwards the information appropriately.

When an object is distributed to the group (e.g., an electronic mail message, a meeting invitation), a service provider invoked to provide the corresponding service calls upon an identity provider to resolve group membership. For example, the service provider may forward the object to all identity providers or some subset of identity providers, along with the name of the opaque group and/or the secondary identifiers of the group's members. The identity provider then resolves group membership to the members' primary identifiers and forwards the object.

Illustratively, if members have random or arbitrary secondary identities within the group, the service provider may need to forward the object to all identity providers within the federation to ensure it reaches all members. Each identity provider will forward the object to its users that are members of the group. Alternatively, if members' secondary identities are tied to their identity providers, then the object may only need to be forwarded to the identified providers.

To authenticate a user as a member of an opaque group (e.g., to allow the user to send an object or take other action in the name of the group), a service provider may invoke an identity provider in order to verify that the user is a member of the group.

In one embodiment of the invention, an opaque group can be joined by request. More specifically, a user desiring to join an opaque group may request membership, and select a secondary identifier if secondary identifiers are used. The request is submitted to or forwarded to an identity provider than can alter group membership (e.g., the identity provider where the group was created)

Figure 2:
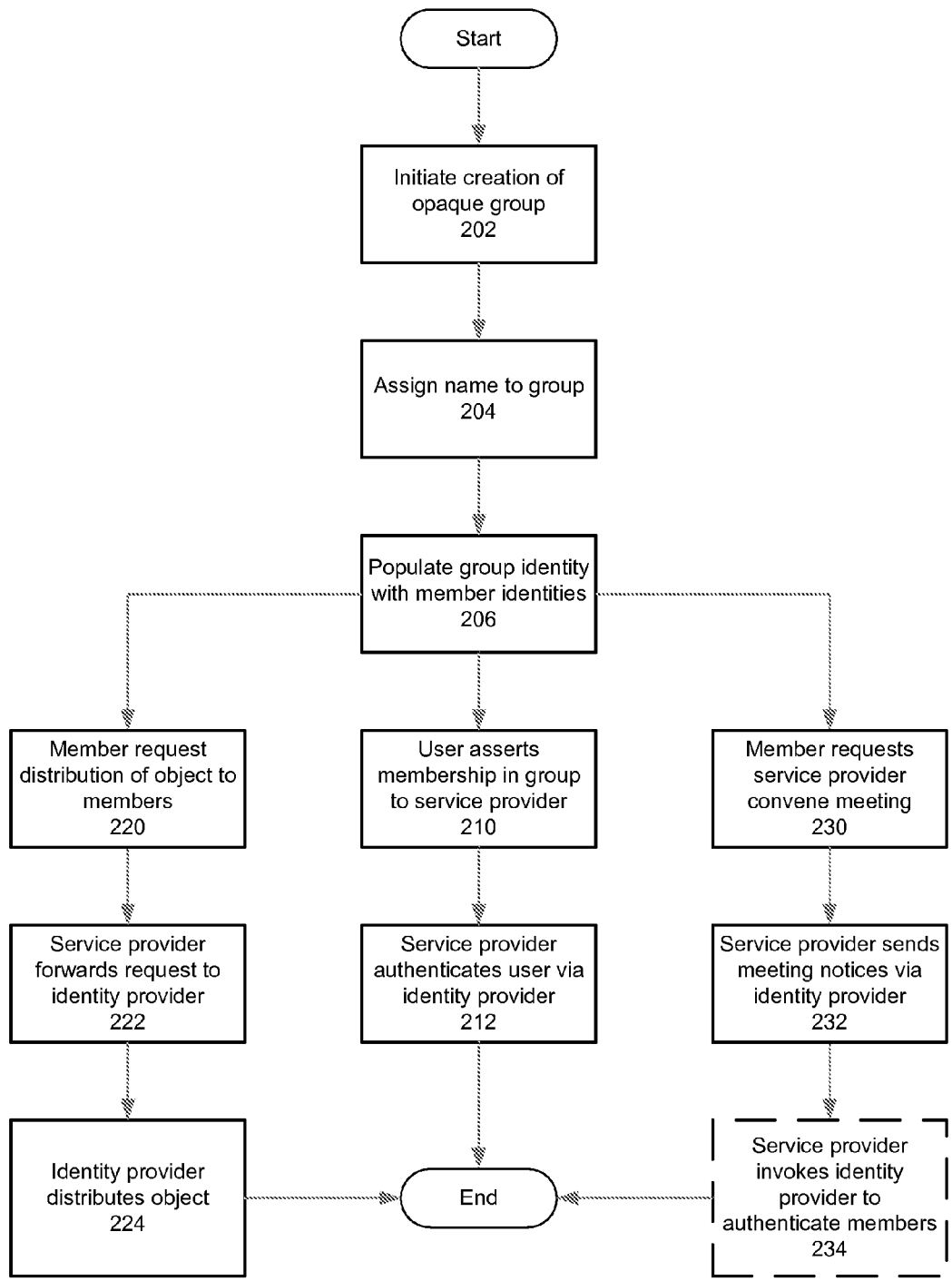
FIG. 2 is a flowchart illustrating one method of using an opaque group within a federated identity management system, in accordance with an embodiment of the invention.

FIG. 2 is a flowchart demonstrating a method of using an opaque group within a federated identity management environment (or identity federation), according to one embodiment of the invention.

In operation 202, a user within the identity federation invokes a federation identity provider to create an opaque group and group identity. In this embodiment, the user takes this action at his or her home identity provider—an identity provider within the user's home domain that is configured to authenticate the user when he or she connects to that domain or the identity federation.

In operation 204 the user (or the identity provider) selects a name for the group. Illustratively, the name may be chosen randomly or arbitrarily, or may be chosen to represent a nature or purpose of the group. The user that creates the group may be considered the group's moderator, founder, primary user, etc.

In operation 206, the user populates the opaque group's identity by supplying identities of the members. The identities supplied by the founder may be the members' primary identities within the federated identity management environment, or other identities that an identity provider can authenticate. For example, they may comprise electronic mail addresses, digital certificates, usernames (e.g., usernames within the members' home domains of the identity federation), etc.

In one alternative embodiment, after a group is created by a founding user or an identity provider, federation users may join simply by requesting membership.

Users may have to be authenticated before they can be added as members, so that their primary (or other) identities can be verified.

After operation 206, various activities can be performed using the group name, without disclosing the members' true or primary identities.

For example, in operation 210 a putative member of the opaque group attempts to access a resource associated with the group, tries to login as a group member, or tries to take some other action that requires his or her group membership to be verified.

In operation 212, a service provider responsible for providing the service or action requested by the member issues a request to an identity provider to authenticate the user (if not already authenticated) and verify the user's membership in the group. The identity provider authenticates the member to the service provider based on the identity information supplied when the group was created (e.g., including the members' actual identities), thereby enabling the service provider to provide the requested service.

If the service provider does not issue the authentication request to the identity provider that "owns" the group (i.e., the identity provider at which the group was created), the request may be forwarded to that identity provider.

As another example of how the opaque group may be used, in operation 220 a member requests a service provider to disseminate an electronic mail message, a document or other object to one or more other members of the group. The request includes the group name and possibly the secondary identities of the members to whom the object is to be distributed (e.g., if distribution is not being made to all members, in which case only the group name is needed).

In operation 222, the requested service provider requests an identity provider to perform the distribution, because the service provider only knows (at most) the recipients' secondary identities, which may have no meaning outside the group. Illustratively, the request is issued or forwarded to the identity provider at which the group was created.

In operation 224, the identity provider sends the object to the specified members of the group (e.g., to all members if only the name of the group is specified), using the identity information supplied when the group was created.

In yet another example of how the opaque group may be used, in operation 230 a member of the group may request a service provider set up a virtual or online meeting for members of the group.

In operation 232, the service provider can send meeting invitations to the members, meeting reminders, meeting settings (e.g., an identifier of the meeting, network address at which to connect to the meeting, required or recommended configuration settings for the members' computing devices), etc. As described above, these messages may be forwarded by the service provider to an identity provider that has access to the members' identities.

In operation 234, the service provider may also be asked to authenticate users as group members as they attempt to connect to the meeting. As described above, again the service provider may consult with an identity provider in order to perform the member authentication.

In some embodiments of the invention, service providers may need to be specifically authorized to use an opaque group. In these embodiments, unless authorized (e.g., by the identity provider that owns the group), a service provider will reject service requests involving the group or the secondary identities of group members.

Also in some embodiments of the invention, actual group member identity information (e.g., the member's primary identities) may reside only at the identity provider(s) that own the group. In these embodiments, all activities that require authentication or identification of a group member will be forwarded to these identity providers. In other embodiments, member identity information may be disseminated to non-owning identity providers.

The environment in which a present embodiment of the invention is executed may incorporate a general-purpose computer or a special purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of promoting user anonymity within an electronic federated identity management system, the system comprising identity providers configured to authenticate users and service providers configured to provide services to the users, the method comprising operating a set of one or more computers to:
create an opaque group at a first identity provider to include multiple users of the federated identity management system, wherein each user has a primary identity within the system, and wherein creating the opaque group comprises determining a secondary identity for each user that is a member of the opaque group;
store at the first identity provider an identity of the opaque group, wherein the identity references the primary identities of the member users;
receive at a first service provider a request to distribute an object to one or more members of the group;
forward the request from the service provider to an identity provider, wherein forwarding the request comprises forwarding the request along with the identity for the opaque group and the secondary identities for the one or more members; and
facilitate the provision of services by the service providers to members of the opaque group without allowing the service providers to know the primary identities of the members of the group.

2. The method of claim 1, wherein said facilitating comprises:
at the identity provider, using the identity for the opaque group and the secondary identities for the one or more members to determine the primary identities of the one or more members; and
forwarding the object to the one or more members from the identity provider.

3. The method of claim 1, wherein said facilitating comprises:
at a service provider:
receiving a connection request from a user asserting membership in the opaque group;
issuing to an identity provider a request to verify the user's membership in the opaque group; and
at the identity provider, attempting to authenticate the user as a member of the group.

4. The method of claim 1, wherein a user's primary identity within the federated identity management system enables communication with that user.

5. The method of claim 4, wherein the user's primary identity is one of a group of identities comprising:
an electronic mail address;
a digital certificate; and
a network address.

6. The method of claim 4, wherein the user's primary identity comprises a digital certificate.

7. The method of claim 1, further comprising:
withholding the primary identities of each member of the opaque group from other members of the opaque group.

8. The method of claim 1, further comprising:
populating the opaque group with the secondary identities of members of the group, said secondary identities configured to allow the members to be identified within the group without using their primary identities.

9. The method of claim 8, wherein a first member's secondary identifier is configured to identify the identity provider that maintains the first members' primary identity without identifying the first member's primary identity.

10. The method of claim 8, wherein a first member's secondary identifier is configured to identify another opaque group the first member belongs to.

11. The method of claim 8, wherein a first member's secondary identifier is configured to identify an indirection entity configured to enable communication with the first member via a method determined by a context of the communication.

12. A non-transitory computer-readable medium storing instructions that, when executed by a computer, cause the computer to perform a method of promoting user anonymity within an electronic federated identity management system, the system comprising identity providers configured to authenticate users and service providers configured to provide services to the users, the method comprising:
creating an opaque group at a first identity provider to include multiple users of the federated identity management system, wherein each user has a primary identity within the system, and wherein creating the opaque group comprises determining a secondary identity for each user that is a member of the opaque group;
storing at the first identity provider an identity of the opaque group, wherein the identity references the primary identities of the member users;
receiving at a first service provider a request to distribute an object to one or more members of the group;
forwarding the request from the service provider to an identity provider, wherein forwarding the request comprises forwarding the request along with the identity for the opaque group and the secondary identities for the one or more members; and
facilitating the provision of services by the service providers to members of the opaque group without allowing the service providers to know the primary identities of the members of the group.

13. A computer-implemented method of enabling users within an electronic federated identity management system to access a resource of the system anonymously, the method comprising operating a set of computer processors to:
establish an identity of an opaque group at a first identity provider within the system;
configure said group identity to include identities of members of the group, wherein configuring said group identity to include identities of members of the group comprises determining a secondary identity for each member of the group; and
within the system, enable service providers to provide services to the group without knowledge of the identities of the members of the group, wherein said enabling comprises configuring the service providers to forward service requests for the group to an identity provider having access to said group identity, wherein forwarding the service requests comprises forwarding the service requests along with said group identity and the secondary identities for the one or more members,
wherein the identity of each member is unknown to the service providers and to all other members of the group.

14. A non-transitory computer-readable medium storing instructions that, when executed by a computer, cause the computer to perform a method of enabling users within an electronic federated identity management system to access a resource of the system anonymously, the method comprising:
establishing an identity of an opaque group at a first identity provider within the system;

configuring said group identity to include identities of members of the group, wherein configuring said group identity to include identities of members of the group comprises determining a secondary identity for each member of the group;

within the system, enabling service providers to provide services to the group without knowledge of the identities of the members of the group, wherein said enabling comprises configuring the service providers to forward service requests for the group to an identity provider having access to said group identity, wherein forwarding the service requests comprises forwarding the service requests along with said group identity and the secondary identities for the one or more members, wherein the identity of each member is unknown to the service providers and to all other members of the group.

15. A federated identity management system of multiple computer domains, in which an automated service is provided to a group of anonymous users of the multiple computer domains, the system comprising:

within each computer domain, at least one identity provider configured to authenticate users of the computer domain;

at least one computer that performs operations for at least one service provider configured to:
 receive service requests from users of the system; and
 provide requested services to the users; and a group identity stored at a first identity provider and associated with an opaque group, wherein:
 said group comprises primary identities of members of the opaque group;
 said group identity comprises a secondary identity for each primary identity of members of the group; and
 said group identity and not the members' primary identities are releasable to service providers;

wherein the at least one service provider is further configured to forward to the first identity provider requests to provide services to the group, wherein while forwarding the request from the at least one service provider to the first identity provider, the at least one service provider is configured to forward the request along with said group identity and the secondary identities for the one or more members.

16. The federated identity management system of claim 15, wherein, for each member of the opaque group:
 the secondary identity for the member is configured to identify the member within the opaque group without revealing the member's primary identity.

17. The federated identity management system of claim 16, wherein a first member's secondary identifier is configured to identify an identity provider configured to maintain the first members' primary identity, without identifying the first member's primary identity.

18. The federated identity management system of claim 16, wherein a first member's secondary identifier is configured to identify another opaque group the first member belongs to.

19. The federated identity management system of claim 16, wherein a first member's secondary identifier is configured to identify an indirection entity configured to enable communication with the first member via a method determined by a context of the communication.

* * * * *